(12) United States Patent
Melanson et al.

(10) Patent No.: US 10,187,934 B2
(45) Date of Patent: Jan. 22, 2019

(54) CONTROLLED ELECTRONIC SYSTEM POWER DISSIPATION VIA AN AUXILIARY-POWER DISSIPATION CIRCUIT

(71) Applicant: PHILIPS LIGHTING HOLDING B.V., Eindhoven (NL)

(72) Inventors: John L. Melanson, Austin, TX (US); Prashanth Drakshapalli, Austin, TX (US); Siddharth Maru, Austin, TX (US); Rahul Singh, Austin, TX (US)

(73) Assignee: PHILIPS LIGHTING HOLDING B.V., Eindhover (NL)

( * ) Notice: Subject to any disclaimer, the term of this patent is extended or adjusted under 35 U.S.C. 154(b) by 869 days.

(21) Appl. No.: 14/212,376

(22) Filed: Mar. 14, 2014

(65) Prior Publication Data
US 2014/0265916 A1 Sep. 18, 2014

Related U.S. Application Data

(60) Provisional application No. 61/782,253, filed on Mar. 14, 2013.

(51) Int. Cl.
*H05B 33/08* (2006.01)

(52) U.S. Cl.
CPC ..... *H05B 33/0809* (2013.01); *H05B 33/0815* (2013.01); *H05B 33/0848* (2013.01); *Y02B 20/346* (2013.01); *Y02B 20/383* (2013.01)

(58) Field of Classification Search
CPC ............... H05B 33/0809; H05B 33/02
(Continued)

(56) References Cited

U.S. PATENT DOCUMENTS 4,523,128 A 6/1985 Stamm et al.
5,055,746 A 10/1991 Feng-Kang et al.
(Continued)

FOREIGN PATENT DOCUMENTS

CN 1421986 A 6/2003
CN 1459216 A 11/2004
(Continued)

OTHER PUBLICATIONS

Supertex, Inc., HV9931 Unity Power Factor LED Lamp Driver, pp. 1-7, 2005, Sunnyvale, California, USA. (Per MPEP 609.04(a), Applicant points out that the year of publication is sufficiently earlier than the effective U.S. filing date and any foreign priority date so that the particular month of publication is not in issue.).
(Continued)

*Primary Examiner* — Claire X Pappas
*Assistant Examiner* — Jonathan G Cooper
(74) *Attorney, Agent, or Firm* — Akarsh P. Belagodu

(57) ABSTRACT

An electronic system and method include a controller to actively control transfer of excess energy to an auxiliary-winding of an auxiliary power dissipation circuit. The excess energy is a transfer of energy from a primary winding of a switching power converter to the auxiliary-winding of the auxiliary power dissipation circuit. In at least one embodiment, the electronic system is a lighting system that includes a triac-based dimmer. The excess energy is energy drawn through the primary-side winding of the switching power converter to provide operational compatibility between a dimmer through which a power supply provides energy to the switching power converter and a load to which the switching power converter provides energy.

17 Claims, 8 Drawing Sheets

(58) Field of Classification Search
USPC .................................................. 315/291, 224
See application file for complete search history.

(56) References Cited

U.S. PATENT DOCUMENTS

| | | |
|---|---|---|
| 5,179,324 A | 1/1993 | Audbert |
| 5,319,301 A | 6/1994 | Callahan et al. |
| 5,321,350 A | 6/1994 | Haas |
| 5,430,635 A | 7/1995 | Liu |
| 5,604,411 A | 2/1997 | Venkitasubrahmanian et al. |
| 5,691,605 A | 11/1997 | Xia et al. |
| 5,770,928 A | 6/1998 | Chansky et al. |
| 6,043,635 A | 3/2000 | Downey |
| 6,046,550 A | 4/2000 | Ference et al. |
| 6,091,205 A | 7/2000 | Newman et al. |
| 6,211,624 B1 | 4/2001 | Holzer |
| 6,380,692 B1 | 4/2002 | Newman et al. |
| 6,407,514 B1 | 6/2002 | Glaser et al. |
| 6,621,256 B2 | 9/2003 | Muratov et al. |
| 6,713,974 B2 | 3/2004 | Patcharnik et al. |
| 6,858,995 B2 | 2/2005 | Lee et al. |
| 6,900,599 B2 | 5/2005 | Ribarich |
| 7,102,902 B1 | 9/2006 | Brown et al. |
| 7,180,250 B1 | 2/2007 | Gannon |
| 7,184,937 B1 | 2/2007 | Su et al. |
| 7,656,103 B2 | 2/2010 | Shteynberg et al. |
| 7,719,246 B2 | 5/2010 | Melanson |
| 7,728,530 B2 | 6/2010 | Wang et al. |
| 7,733,678 B1 | 6/2010 | Notohamiprodjo et al. |
| 7,750,580 B2 | 7/2010 | Lu et al. |
| 7,759,881 B1 | 7/2010 | Melanson |
| 7,786,711 B2 | 8/2010 | Wei et al. |
| 7,872,427 B2 | 1/2011 | Scianna |
| 8,102,167 B2 | 1/2012 | Irissou et al. |
| 8,115,419 B2 | 2/2012 | Given et al. |
| 8,169,154 B2 | 5/2012 | Thompson et al. |
| 8,212,491 B2 | 7/2012 | Kost |
| 8,212,492 B2 | 7/2012 | Lam et al. |
| 8,222,832 B2* | 7/2012 | Zheng ............... H05B 33/0815 315/211 |
| 8,482,220 B2 | 7/2013 | Melanson |
| 8,487,546 B2 | 7/2013 | Melanson |
| 8,508,147 B2 | 8/2013 | Shen |
| 8,536,794 B2 | 9/2013 | Melanson et al. |
| 8,536,799 B1 | 9/2013 | Grisamore et al. |
| 8,547,034 B2 | 10/2013 | Melanson et al. |
| 8,569,972 B2 | 10/2013 | Melanson |
| 8,610,364 B2 | 12/2013 | Melanson et al. |
| 8,610,365 B2 | 12/2013 | King et al. |
| 8,664,885 B2 | 3/2014 | Koolen et al. |
| 8,716,957 B2 | 5/2014 | Melanson et al. |
| 8,749,173 B1 | 6/2014 | Melanson et al. |
| 8,847,515 B2 | 9/2014 | King et al. |
| 2002/0140371 A1 | 10/2002 | Chou et al. |
| 2004/0105283 A1 | 6/2004 | Schie et al. |
| 2004/0212321 A1 | 10/2004 | Lys |
| 2006/0022648 A1 | 2/2006 | Ben-Yaakov et al. |
| 2006/0208669 A1 | 9/2006 | Huynh et al. |
| 2007/0182338 A1 | 8/2007 | Shteynberg |
| 2007/0182347 A1 | 8/2007 | Shteynberg |
| 2008/0018261 A1 | 1/2008 | Kastner |
| 2008/0101098 A1 | 5/2008 | Disney |
| 2008/0143266 A1 | 6/2008 | Langer |
| 2008/0192509 A1 | 8/2008 | Dhuyvetter et al. |
| 2008/0203934 A1 | 8/2008 | Van Meurs |
| 2008/0205103 A1 | 8/2008 | Sutardja et al. |
| 2008/0224629 A1 | 9/2008 | Melanson |
| 2008/0224633 A1 | 9/2008 | Melanson |
| 2008/0224636 A1 | 9/2008 | Melanson |
| 2009/0134817 A1 | 5/2009 | Jurngwirth et al. |
| 2009/0135632 A1 | 5/2009 | Sohma |
| 2009/0195186 A1 | 8/2009 | Guest et al. |
| 2009/0284182 A1 | 11/2009 | Cencur |
| 2010/0002480 A1 | 1/2010 | Huynh et al. |
| 2010/0013405 A1 | 1/2010 | Thompson et al. |
| 2010/0013409 A1 | 1/2010 | Quek et al. |
| 2010/0066328 A1 | 3/2010 | Shimizu et al. |
| 2010/0164406 A1 | 7/2010 | Kost et al. |
| 2010/0165671 A1* | 7/2010 | Coulson ............... H01F 27/324 363/21.12 |
| 2010/0213859 A1 | 8/2010 | Shteynberg |
| 2010/0231136 A1 | 9/2010 | Reisenbauer et al. |
| 2010/0244726 A1* | 9/2010 | Melanson ......... H02M 3/33523 315/291 |
| 2010/0327765 A1* | 12/2010 | Melanson ........... H02M 3/3374 315/291 |
| 2011/0043133 A1 | 2/2011 | Van Laanen et al. |
| 2011/0080110 A1 | 4/2011 | Nuhfer et al. |
| 2011/0084622 A1 | 4/2011 | Barrow et al. |
| 2011/0084623 A1 | 4/2011 | Barrow |
| 2011/0109230 A1 | 5/2011 | Simi |
| 2011/0115395 A1 | 5/2011 | Barrow et al. |
| 2011/0121754 A1 | 5/2011 | Shteynberg |
| 2011/0148318 A1 | 6/2011 | Shackle et al. |
| 2011/0204797 A1 | 8/2011 | Lin et al. |
| 2011/0204803 A1 | 8/2011 | Grotkowski et al. |
| 2011/0234115 A1 | 9/2011 | Shimizu et al. |
| 2011/0266968 A1 | 11/2011 | Bordin et al. |
| 2011/0291583 A1 | 12/2011 | Shen |
| 2011/0309759 A1 | 12/2011 | Shteynberg et al. |
| 2011/0316441 A1 | 12/2011 | Huynh |
| 2012/0049752 A1 | 3/2012 | King et al. |
| 2012/0068626 A1 | 3/2012 | Lekatsas et al. |
| 2012/0098454 A1 | 4/2012 | Grotkowski et al. |
| 2012/0112638 A1 | 5/2012 | Melanson et al. |
| 2012/0112651 A1 | 5/2012 | King et al. |
| 2012/0133291 A1 | 5/2012 | Kitagawa et al. |
| 2012/0286684 A1* | 11/2012 | Melanson ........... H02M 1/4225 315/224 |
| 2012/0286686 A1 | 11/2012 | Watanabe et al. |
| 2012/0319607 A1* | 12/2012 | Watanabe ........... H05B 33/0848 315/206 |
| 2012/0319610 A1* | 12/2012 | Yoshinaga ......... H05B 33/0848 315/210 |
| 2013/0015768 A1 | 1/2013 | Roberts et al. |
| 2013/0154495 A1 | 6/2013 | He |
| 2013/0193879 A1 | 8/2013 | Sadwick et al. |
| 2014/0009082 A1 | 1/2014 | King et al. |

FOREIGN PATENT DOCUMENTS

| | | |
|---|---|---|
| CN | 1748446 A | 3/2006 |
| CN | 1843061 A1 | 10/2006 |
| CN | 101164383 A | 4/2008 |
| CN | 101505568 A | 8/2009 |
| CN | 101595764 A | 12/2009 |
| CN | 101707874 A | 5/2010 |
| CN | 101835314 | 9/2010 |
| CN | 101926222 | 12/2010 |
| EP | 1164819 | 12/2001 |
| EP | 2257124 A1 | 1/2010 |
| EP | 2232949 | 9/2010 |
| JP | 2008053181 A | 3/2008 |
| JP | 2009170240 A | 7/2009 |
| WO | 9917591 | 4/1999 |
| WO | 02096162 | 11/2002 |
| WO | 2006079937 | 8/2006 |
| WO | 2008029108 | 3/2008 |
| WO | 2008112822 A2 | 9/2008 |
| WO | 2010011971 A1 | 1/2010 |
| WO | 2010035155 A2 | 4/2010 |
| WO | 2011008635 A1 | 1/2011 |
| WO | 2011050453 A1 | 5/2011 |
| WO | 2011056068 A2 | 5/2011 |
| WO | 2012016197 A1 | 2/2012 |
| WO | 2010027493 A2 | 3/2012 |

OTHER PUBLICATIONS

Wang Xiao, Phase Control Dimming of the Dimmable Lighting System, Journal of Wuxi University of Light Industry, Jul. 31, 2000, vol. 19, No. 4, pp. 1-3. The Abstract contains a concise explanation

(56) References Cited

OTHER PUBLICATIONS in English and the Search Report identifies the following portions as related to the claims in the Present Application: p. 408, right-hand column, section 2, and figures 5-7.

Amanci, et al, "Synchronization System with Zero-Crossing Peak Detection Algorithm for Power System Applications", The 2010 International Power Electronics Conference, pp. 2984-2991, Toronto, Ontario, Canada.

Patterson, James, "Efficient Method for Interfacing Triac Dimmers and LEDs", National Semiconductor Corp., pp. 29-32, Jun. 23, 2011, USA.

Vainio, Olli, "Digital Filtering for Robust 50/60 Hz Zero-Crossing Detectors", IEEE Transactions on Instrumentation and Measurement, vol. 45, No. 2, pp. 426-430, Apr. 1996, University of Santa Barbara, California, USA.

Azoteq, IQS17 Family, IQ Switch-ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.

Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.

Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.

Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.

Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.

Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.

Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.

Engdahl, Tomi, Light Dimmer Circuits, 1997-2000, www.epanorama.net.

O'Rourke, Conan, et al, Dimming Electronic Ballasts, National Lighting Product Information Program, Specifier Reports, vol. 7, No. 3, Oct. 1999, pp. 1-24, Troy, NY, USA.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Lutron, Fluorescent Dimming Systems Technical Guide, copyright 2002, Why Different Dimming Ranges, http://www.lutron.com/TechnicalDocumentLibrary/LutronBallastpg3.pdf, p. 3, Coopersburg PA, USA.

Wu, Tsai-Fu, et al, Single-Stage Electronic Ballast with Dimming Feature and Unity Power Factor, IEEE Transactions on Power Electronics, vol. 13, No. 3, May 1998, pp. 586-597.

International Search Report, PCT/US2014/028299, European Patent Office, dated Aug. 5, 2014, pp. 1-4.

Written Opinion, PCT/US2014/028299, European Patent Office, dated Aug. 5, 2014, pp. 1-7.

\* cited by examiner

CONTROLLED ELECTRONIC SYSTEM POWER DISSIPATION VIA AN AUXILIARY-POWER DISSIPATION CIRCUIT

CROSS-REFERENCE TO RELATED APPLICATION

This application claims the benefit under 35 U.S.C. § 119(e) and 37 C.F.R. § 1.78 of U.S. Provisional Application No. 61/782,253, filed Mar. 14, 2013, which is incorporated by reference in its entirety.

BACKGROUND OF THE INVENTION

Field of the Invention

The present invention relates in general to the field of electronics, and more specifically to a system and method of controlling power dissipation via an auxiliary power dissipation circuit of an electronic system, such as a lighting system.

Description of the Related Art

Switching power converters convert power received from a power source, such as a voltage supply, into power suitable for a load. The power received from the voltage supply is referred to as "POWER IN", and the power provided to the load is referred to as "POWER OUT". All switching power converters have some inherent power losses due to, for example, non-ideal component characteristics. Such inherent power losses tend to be minimized so as to increase the efficiency of the switching power converters. Inherent power losses are represented herein by "$P_{INH}$". In some contexts the amount of power supplied to the switching power converter can exceed the amount of power provided by the switching power converter to a load, i.e. POWER IN>POWER OUT+$P_{INH}$. When the POWER IN is greater than the POWER OUT+$P_{INH}$, the switching power converter passively dissipates the excess energy using passive resistors.

A dimmable lighting system that includes a low power lamp, such as one or more light emitting diodes (LEDs), represents one context when the POWER IN to the switching power converter can be greater than the POWER OUT plus inherent power losses $P_{INH}$ power of the switching power converter. In this exemplary context, the switching power converter receives current through a triode for alternating current ("triac") based dimmer. Once a triac-based dimmer begins conducting during a cycle of an alternating current ("AC") supply voltage to prevent the triac from disadvantageously, prematurely disconnecting during mid-cycle of the supply voltage, the switching power converter draws a minimum current referred to as a "hold current". As long as an input current to the switching power converter is greater than or equal to the hold current, the triac-based dimmer should not prematurely disconnect. For a leading edge dimmer, a premature disconnect occurs when the dimmer begins conducting and stops conducting prior to reaching a zero crossing of the supply voltage. Premature disconnects can cause problems with the lighting system, such as flicker and instability.

Thus, to prevent premature disconnection of the triac-based dimmer, the minimum POWER IN to the switching power converter equals the hold current ("$i_{HOLD}$") times an input voltage "$V_{IN}$" to the switching power converter. Conventional triac-based dimmers were designed to provide power to incandescent light bulbs. For desired dimming levels, an incandescent light bulb generally draws a current at least equal to the hold current for all usable dimming levels. However, other lamps, such as LEDs are more efficient than incandescent light bulbs in terms of power versus light output and, thus, provide equivalent light output while using less power than an incandescent light bulb. Thus, lighting systems with LEDs typically utilize less power and less current than incandescent bulbs. To balance the power when the lighting system draws more POWER IN power than the lighting system inherently dissipates and provides as POWER OUT power to the lamp, the lighting system utilizes one or more passive resistors to internally dissipate excess power.

FIG. 1 depicts a lighting system 100 that includes a leading edge, phase-cut dimmer 102. FIG. 2 depicts ideal, exemplary voltage graphs 200 associated with the lighting system 100. Referring to FIGS. 1 and 2, the lighting system 100 receives an AC supply voltage $V_{IN}$ from voltage supply 104. The supply voltage $V_{IN}$, indicated by voltage waveform 202, is, for example, a nominally 60 Hz/110 V line voltage in the United States of America or a nominally 50 Hz/220 V line voltage in Europe. A leading edge dimmer 102 phase cuts leading edges, such as leading edges 204 and 206, of each half cycle of supply voltage $V_{IN}$. Since each half cycle of supply voltage $V_{IN}$ is 180 degrees of the input supply voltage $V_{IN}$, the leading edge dimmer 102 phase cuts the supply voltage $V_{IN}$ at an angle greater than 0 degrees and less than 180 degrees. Generally, the voltage phase cutting range of a leading edge dimmer 102 is 10 degrees to 170 degrees. "Phase cutting" the supply voltage refers to modulating a leading edge phase angle of each cycle of an alternating current ("AC") supply voltage. "Phase cutting" of the supply voltage is also commonly referred to as "chopping". Phase cutting the supply voltage reduces the average power supplied to a load, such as a lighting system, and thereby controls the energy provided to the load.

The input signal voltage $V_{\phi\_IN}$ to the lighting system 100 represents a dimming level that causes the lighting system 100 to adjust power delivered to a lamp 122, and, thus, depending on the dimming level, increase or decrease the brightness of the lamp 122. Many different types of dimmers exist. In general, dimmers use a digital or analog coded dimming signal that indicates a desired dimming level. For example, the triac-based dimmer 102 phase cuts a leading edge of the AC input supply voltage $V_{IN}$. The leading edge dimmer 102 can be any type of leading edge dimmer such as a triac-based leading edge dimmer available from Lutron Electronics, Inc. of Coopersberg, Pa. ("Lutron"). A triac-based leading edge dimmer is described in the Background section of U.S. patent application Ser. No. 12/858,164, entitled Dimmer Output Emulation, filed on Aug. 17, 2010, and inventor John L. Melanson.

The phase cut dimmer 102 supplies the input voltage $V_{\phi\_IN}$ as modified by the phase cut dimmer 102 to a full bridge diode rectifier 106. The full bridge rectifier 106 supplies an AC rectified voltage $V_{\phi R\_IN}$ to the switching power converter 108. Capacitor 110 filters high frequency components from rectified voltage $V_{\phi R\_IN}$. To control the operation of switching power converter 108, controller 110 generates a control signal $CS_0$ to control conductivity of field effect transistor (FET) switch 112. The control signal $CS_0$ is a pulse width modulated signal. Waveform 114 for control signal $CS_0$ represents an exemplary control signal $CS_0$. The controller 110 generates the control signal $CS_0$ with two states as shown in the waveform 114. Each pulse of control signal $CS_0$ turns switch 112 ON (i.e. conducts) and represents a first state that causes the switch 112 to operate efficiently and minimize power dissipation by the switch 112. During each pulse of control signal $CS_0$, the inductor current $i_L$ increases, as shown in the exemplary inductor current waveform 115, to charge inductor 116 during a charging phase $T_c$. Diode 118 prevents current flow from link capacitor 120 into switch 112. When the pulse of control signals $CS_0$ ends, the control signal $CS_0$ is in a second state, and the inductor 116 reverses voltage polarity (commonly referred to as "flyback"). The inductor current $i_L$ decreases during the flyback phase $T_{FB}$, as shown in inductor current waveform 115. The inductor current $i_L$ boosts the link voltage across the link capacitor 120 through diode 118. When the flyback phase $T_{FB}$ ends and when the next charging phase $T_c$ begins depends on the operating mode of the switching power converter. In discontinuous conduction mode (DCM), the flyback phase $T_{FB}$ ends before the next charging phase $T_c$ begins. However, regardless of whether the switching power converter 108 operates in discontinuous conduction mode, continuous conduction mode, or critical conduction mode, the flyback phase $T_{FB}$ begins as soon as the charging phase $T_c$ ends.

The switching power converter 108 is a boost-type converter, and, thus, the link voltage $V_{LINK}$ is greater than the rectified input voltage $V_{\phi R\_IN}$. Controller 110 senses the rectified input voltage $V_{\phi R\_IN}$ at node 124 and senses the link voltage $V_{LINK}$ at node 126. Controller 110 operates the switching power converter 108 to maintain an approximately constant link voltage $V_{LINK}$ for lamp 122, provide power factor correction, and correlate the link current $i_{LINK}$ with the phase cut angle of the rectified input voltage $V_{\phi R\_IN}$. Lamp 122 includes one or more light emitting diodes.

FIG. 3 depicts an exemplary light output/power graph 300 that compares light output per watt of power for an exemplary incandescent bulb and an exemplary light emitting diode (LED). Per watt of power, LEDs provide more light output than incandescent light bulbs. The low power usage by LEDs correlates to a relatively low operating current compared to the operating current for an incandescent light bulb. Since the light output of LEDs is approximately linear with power and LEDs operate at an approximately constant voltage, operating current for an LED decreases approximately linearly with decreasing light output and power.

Referring to FIGS. 1, 2, and 3, to decrease the light output of the lamp 122, the phase cut dimmer 102 increases the phase cut angle of the rectified input voltage $V_{\phi R\_IN}$, i.e. time $T_{OFF}$ increases and time $T_{ON}$ decreases. The controller 110 responds to the increased phase cut angle by decreasing the current $i_{LINK}$ provided to the lamp 122, which decreases the light output of the lamp 122.

The switching power converter 108 includes a power dissipation resistor 128 so that the dimmer current $i_{DIM}$ does not fall below the hold current value and prematurely disconnect during a cycle of the rectified input voltage $V_{\phi R\_IN}$. The "POWER IN" power supplied to the switching power converter 108 equals $V_{\phi\_IN} \cdot i_{DIM}$. The "POWER OUT" power supplied by switching power converter 108 equals $V_{LINK} \cdot i_{LINK}$. Because of the relatively low power requirements of an LED based lamp 122, particularly at low light output levels, if the POWER IN power equals the POWER OUT+$P_{INH}$ power, the dimmer current $i_{DIM}$ may fall below the hold current value and cause the phase-cut dimmer 102 to prematurely disconnect. In this situation, to prevent the dimmer current $i_{DIM}$ from falling below the hold current value, the controller 110 causes the switching power converter 108 to maintain the dimmer current $i_{DIM}$ above the hold current value, which causes the POWER IN power to be greater than the POWER OUT+$P_{INH}$ power. Since the POWER IN power is greater than the POWER OUT+$P_{INH}$ power, the switching power converter 108 dissipates the excess power through power dissipation resistor 128. This hold current may be of the order of 60-90 mA for U.S. dimmers and 30-45 mA for European and Asia Pacific dimmers.

Because of component non-idealities, the switching power converter 108 includes inherent power losses Inherent power losses include conductor resistances and switching losses in switch 112. However, circuits are generally designed to minimize inherent power losses, and these inherent power losses are often negligible and, thus, insufficient to dissipate enough power to compensate for the difference between the POWER IN power and the POWER OUT+$P_{INH}$ power at some POWER OUT levels. To increase the power loss of switching power converter so that the dimmer current $i_{DIM}$ remains above a hold current value even at lower power demand by the lamp 122, switching power converter 108 includes the resistor 128 to create a passive power loss when switch 112 conducts the inductor current $i_L$. For negligible inherent power losses, the resistance value of the resistor 128 is selected so that when the switching power converter is providing a minimum link current $i_{LINK}$, the POWER IN=POWER OUT+$P_{INH}$+PASSIVE POWER DISSIPATE.

Resistor 128 is relatively cheap to implement as part of switching power converter 108. However, when the link current $i_{LINK}$ is sufficiently high such that POWER IN equals POWER OUT+$P_{INH}$, the dimmer input current $i_{DIM}$ could be maintained above the hold current value without dissipating power through resistor 128. However, since the dimmer input current $i_{DIM}$ always flows through the resistor 128 when the switch 108 is conducting, the resistor 128 still passively dissipates power regardless of whether the POWER IN is equal to the POWER OUT+$P_{INH}$, which decreases the efficiency of lighting system 100.

SUMMARY OF THE INVENTION

In one embodiment of the present invention, an apparatus includes a controller configured to generate an excess energy control signal to control a transfer of excess energy, drawn from a power supply through a primary-side winding of a switching power converter, to an auxiliary-winding of an auxiliary power dissipation circuit to dissipate the excess energy. The excess energy comprises energy drawn through the primary-side winding of the switching power converter to provide operational compatibility between a dimmer and a load.

In another embodiment of the present invention, a method includes generating an excess energy control signal to control a transfer of excess energy, drawn from a power supply through a primary-side winding of a switching power converter, to an auxiliary-winding of an auxiliary power dissipation circuit to dissipate the excess energy. The excess energy comprises energy drawn through the primary-side winding of the switching power converter to provide operational compatibility between a dimmer and a load.

In a further embodiment of the present invention, a lighting system includes one or more light emitting diodes (LEDs) and a switching power converter coupled to the LEDs. The lighting system also includes a controller configured to (1) generate an excess energy control signal to control a transfer of excess energy, drawn from a power supply through a primary-side winding of a switching power converter, to an auxiliary-winding of an auxiliary power dissipation circuit to dissipate the excess energy and (2) control power conversion by the switching power converter for the LEDs. The excess energy comprises energy drawn through the primary-side winding of the switching power converter to provide operational compatibility between a dimmer and the LEDs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An electronic system and method include a controller to actively control transfer of excess energy to an auxiliary transformer winding of an auxiliary power dissipation circuit. The "auxiliary transformer winding" is referred to herein as an "auxiliary-winding." The excess energy is a transfer of energy from a primary winding of a switching power converter to the auxiliary-winding of the auxiliary power dissipation circuit. In at least one embodiment, the electronic system is a lighting system that includes a triac-based dimmer. The excess energy is energy drawn through the primary-side winding of the switching power converter to provide operational compatibility between a dimmer through which a power supply provides energy to the switching power converter and a load to which the switching power converter provides energy. As previously described, when the lighting system includes a light source, such as one or more light emitting diodes (LEDs), that uses less power than an incandescent light bulb, the lighting system draws more power in the form of a holding current from the power supply to maintain compatibility between the dimmer and the light source. The controller causes the switching power converter to draw the excess energy to maintain this compatibility between the dimmer and the light source. Energy equals power multiplied by time. Thus, the dissipation of excess energy over time is referred to as power dissipation.

The particular implementation of the auxiliary power dissipation circuit is a matter of design choice. In at least one embodiment, the auxiliary power dissipation circuit is configured dissipate the excess energy in the form of heat and/or a stored energy for subsequent use. In at least one embodiment, the auxiliary power dissipation circuit includes a Zener diode to dissipate the excess energy as heat. In at least one embodiment, the auxiliary power dissipation circuit also includes a capacitor to store at least some of the excess energy.

Additionally, the controller and the auxiliary dissipation circuit can be configured to transfer the excess energy during either a flyback phase or during a forward phase of the switching power converter. Additionally, in at least one embodiment, excess energy can also be dissipated in other power dissipation circuits that are connected to or included in the switching power converter. Thus, in at least one embodiment, the controller actively controls power dissipation by generating one or more signals to actively and selectively control power dissipation in the electronic system.

Figure 4:
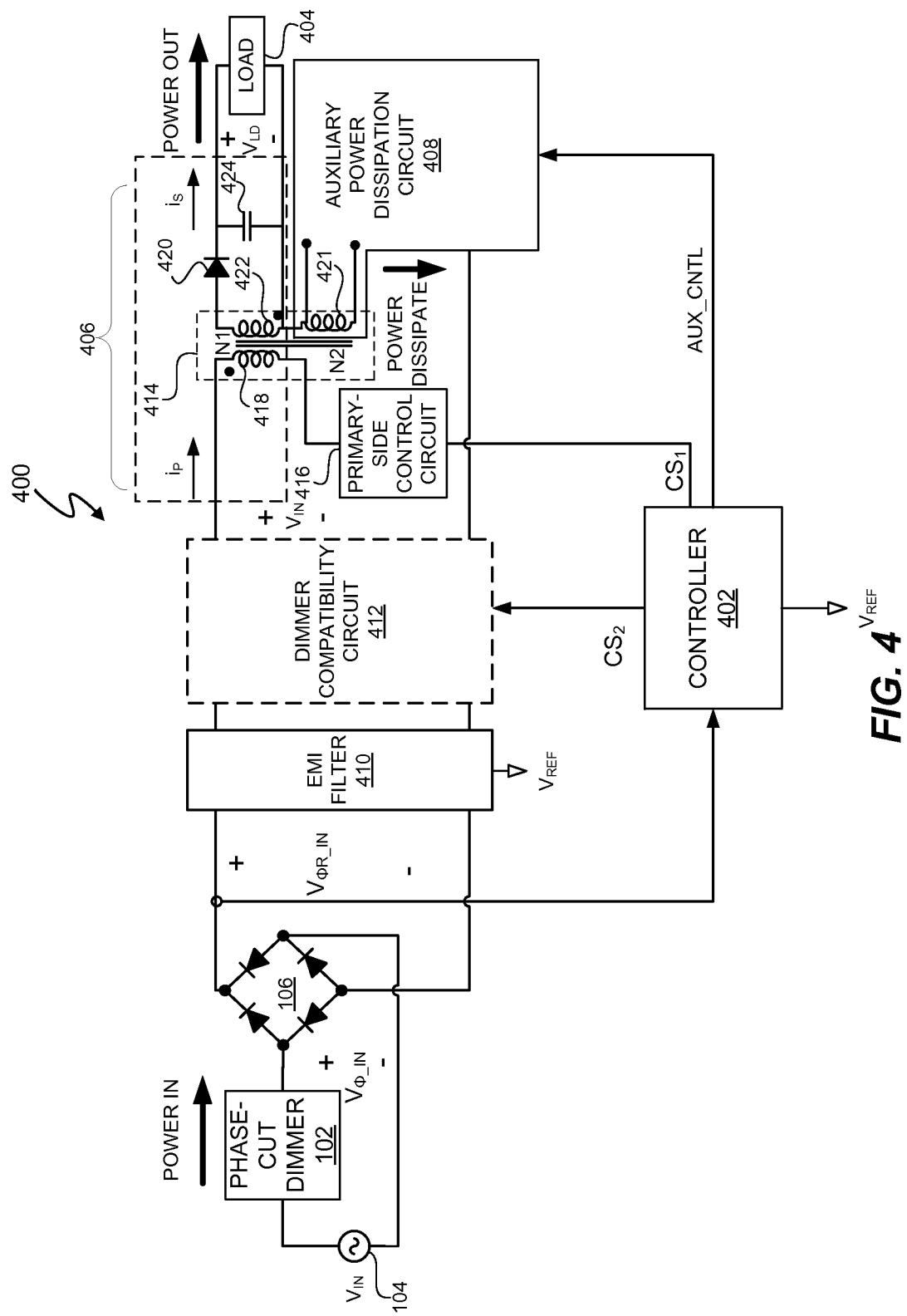
FIG. 4 depicts an electronic system with excess energy transfer to an auxiliary power dissipation circuit.

FIG. 4 depicts an electronic system 400 that includes a controller 402 that maintains compatibility between a dimmer 102 and a load 404, such as one or more LEDs, by controlling a switching power converter 406 to draw excess energy through the dimmer 102 from a power supply 104. In at least one embodiment, the excess energy is more energy than an amount of energy drawn by the switching power converter 406 from the power supply 104 less an amount of energy delivered to the load 404 other than the auxiliary power dissipation circuit (P/S) 408 plus inherent energy losses of the switching power converter 406. Power is defined as an amount of energy transferred over a period of time. In at least one embodiment, the amount of excess energy dissipated by the auxiliary power dissipation circuit 408 over a half line cycle of the supply voltage $V_{IN}$ is constant or at least approximately constant, and, thus, the average power dissipation by the auxiliary power dissipation circuit 408 over the half line cycle is also constant or at least approximately constant.

Figure 1:
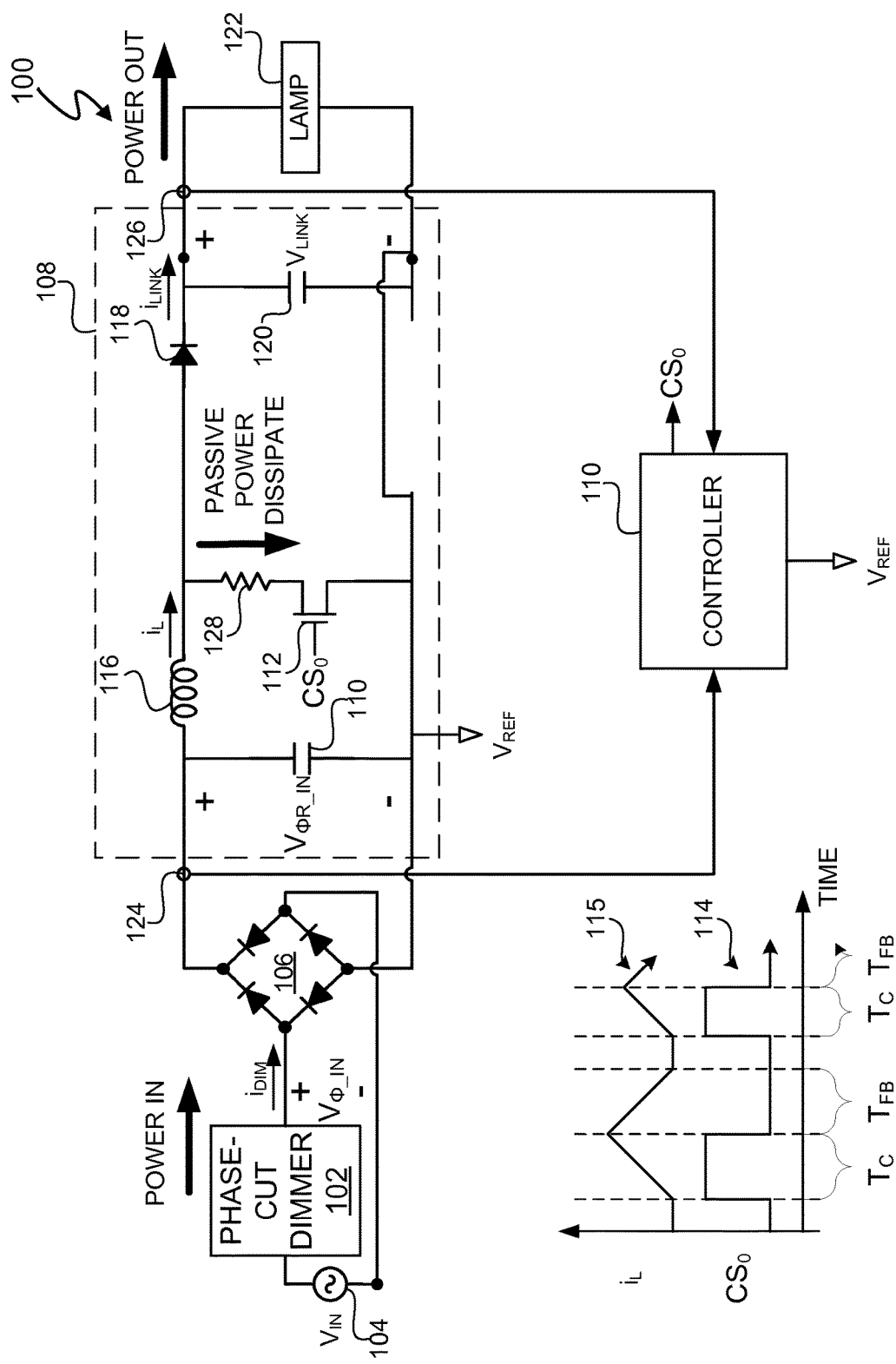
FIG. 1 (labeled prior art) depicts a lighting system that includes a leading edge dimmer.
Figure 2:
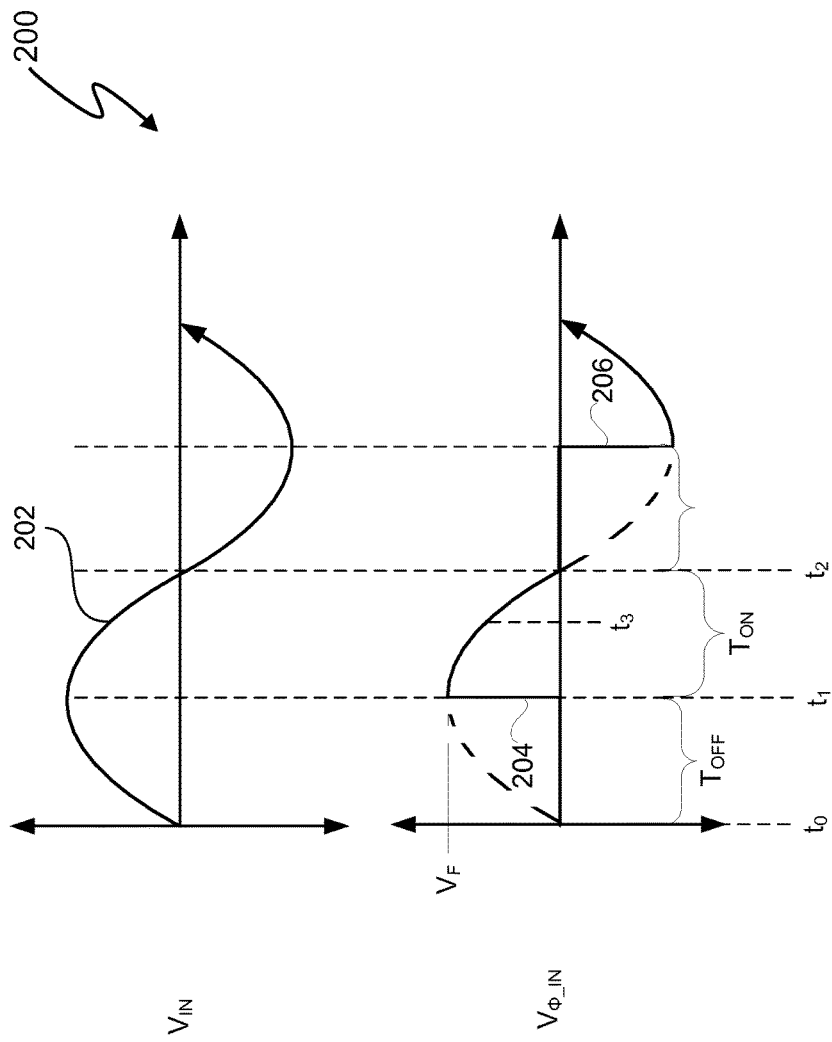
FIG. 2 (labeled prior art) depicts exemplary voltage graphs associated with the lighting system of FIG. 1.
Figure 3:
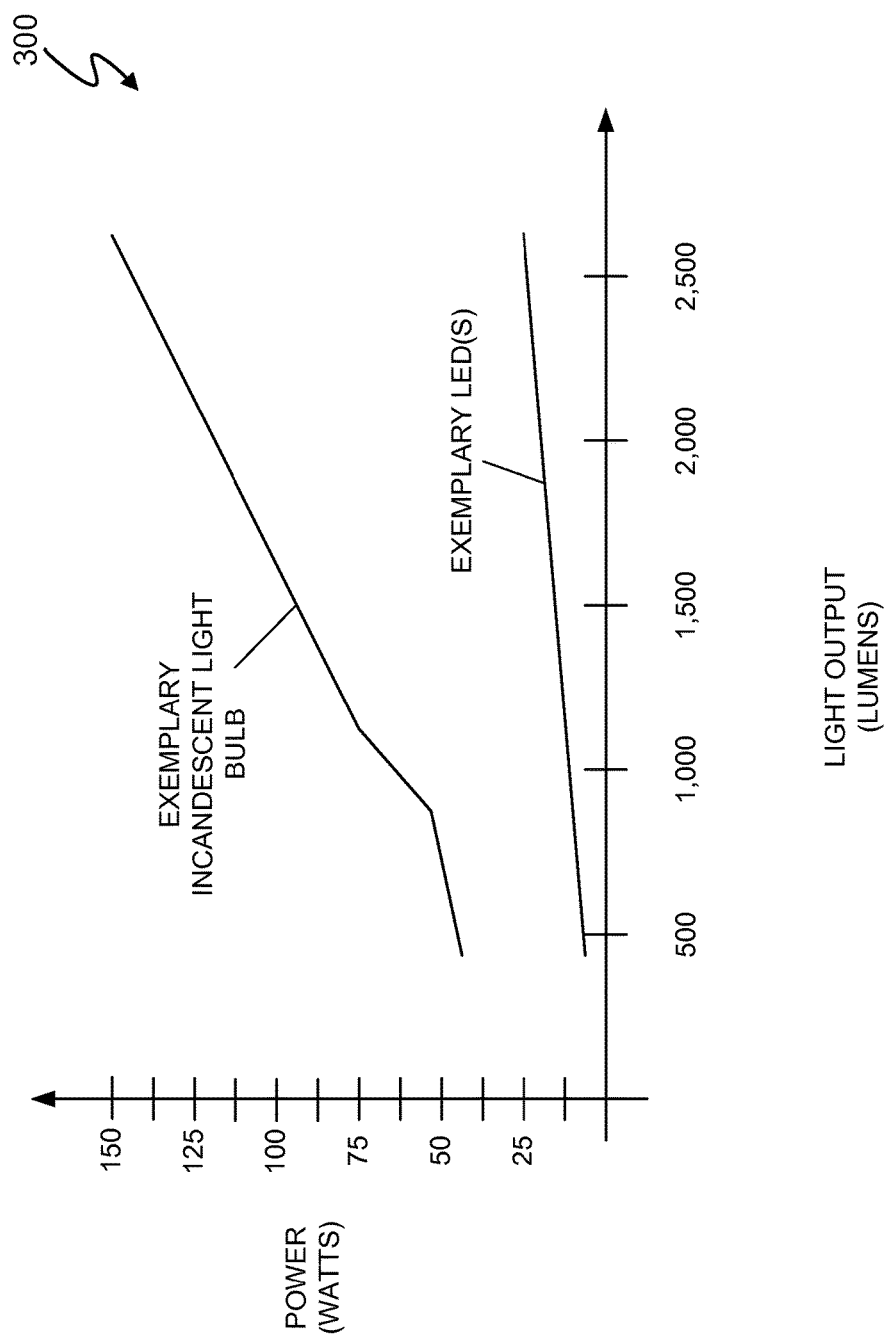
FIG. 3 (labeled prior art) depicts power versus light output for exemplary incandescent bulbs and light emitting diodes.

The power supply 104, dimmer 102, and full-bridge rectifier 106 function as described in conjunction with FIGS. 1 and 2 to generate the rectified dimmer voltage $V_{\phi R\_IN}$. Referring to FIG. 4, the electronic system 400, which in at least one embodiment, is a lighting system, includes an electromagnetic interference (EMI) filter 410. The particular design of the EMI filter 410 is a matter of design choice, and, in at least one embodiment, is a capacitor such as capacitor 110. The electronic system 400 optionally includes a dimmer compatibility circuit 412. The implementation of the dimmer compatibility circuit 412 is a matter of design choice and can be, for example, a DC-DC converter, such as a boost or a buck converter or an active circuit such as described in U.S. patent application Ser. No. 12/858,164, entitled "Dimmer Output Emulation" and filed Aug. 17, 2010 and U.S. patent application Ser. No. 13/290,032, entitled "Switching Power Converter Input Voltage Approximate Zero Crossing Determination" and filed Nov. 4, 2011 that describe exemplary embodiments of dimmer output compatibility systems and methods and are both incorporated by reference in their entireties (referred to herein as the "Dimmer Compatibility Documents"). In at least one embodiment, the electronic system 400 includes the optional dimmer compatibility circuit 412 when the controller 402 is configured to dissipate excess energy in a circuit other than the auxiliary power dissipation circuit 408. In at least one embodiment, the controller 402 generates a control signal $CS_2$ to control dimmer compatibility as described in the Dimmer Compatibility Documents.

The switching power converter 406 includes a primary-side control circuit 416 that controls the draw of energy from the power supply 104 through a primary-side winding 418 of transformer 414. The controller 402 generates control signal $CS_1$ to control the draw of energy by the primary-side control circuit 416 through the primary-side winding 418. The particular implementation of the primary-side control circuit 416 is a matter of design choice. In at least one embodiment, the control signal $CS_1$ is a pulse width modulated signal, and, in at least one embodiment and as subsequently described, the primary-side control circuit 416 is a switch (not shown) whose conductivity follows the pulses of the control signal $CS_1$ and generates pulses of the primary-side current $i_P$ through the primary-side winding 418.

When the auxiliary-winding is configured to conduct during a flyback phase of the switching power converter 406, during the flyback phase, energy is transferred to the auxiliary power dissipation circuit 408. When the auxiliary-winding is configured to conduct during a forward phase of the switching power converter 406, during the forward phase energy, energy is transferred to the auxiliary power dissipation circuit 408. Embodiments of flyback phase energy transfer and forward phase energy transfer are discussed subsequently.

The switching power converter 406 transfers at least the excess energy previously described to the auxiliary power dissipation circuit 408. Whether the excess energy is transferred during the forward phase or the flyback phase is a matter of design choice. In at least one embodiment, the controller 402 generates an excess energy control signal AUXCNTL to control energy transfer to the auxiliary power dissipation circuit 408.

The auxiliary power dissipation circuit 408 dissipates the excess energy, which equates to excess power when the excess energy is transferred over a period of time. The particular implementation of the power auxiliary power dissipation circuit is a matter of design choice. The auxiliary power dissipation circuit can use virtually any circuit to dissipate the excess energy. As subsequently described in more detail, in at least one embodiment, the auxiliary power dissipation circuit includes both active and passive circuits, such as one or more field effect transistors, Zener diodes, capacitors, and/or resistors. In at least one embodiment, the auxiliary power dissipation circuit 408 is configured to dissipate the excess energy in the form of heat in the Zener diode and/or a stored energy for subsequent use in the capacitor.

Additionally, in at least one embodiment, the controller 402 can control excess energy dissipation in other power dissipation circuits that are connected to or included in the switching power converter 406 as for example, described in U.S. patent application Ser. No. 13/289,845, entitled, "Controlled Energy Dissipation in a Switching Power Converter," and filed on Nov. 4, 2011 and U.S. patent application Ser. No. 13/289,931, entitled "Controlled Power Dissipation In A Lighting System," and filed on Nov. 4, 2011, both of which are hereby incorporated by reference in their entireties. Thus, in at least one embodiment, the controller 402 actively controls power dissipation by generating one or more signals to actively and selectively control power dissipation in the electronic system 400.

Although FIG. 4 depicts the auxiliary power dissipation circuit 408 as located separate from the controller 402, the auxiliary power dissipation circuit 408 can be included as part of the controller 402. In at least one embodiment, the controller 402 is an integrated circuit, and the auxiliary power dissipation circuit 408 is located external to the controller 402. Thus, dissipating power outside the controller 402 serves a dual purpose of providing dimmer 102-to-load 404 compatibility and avoiding generating excess heat in the controller 402.

Figure 5:
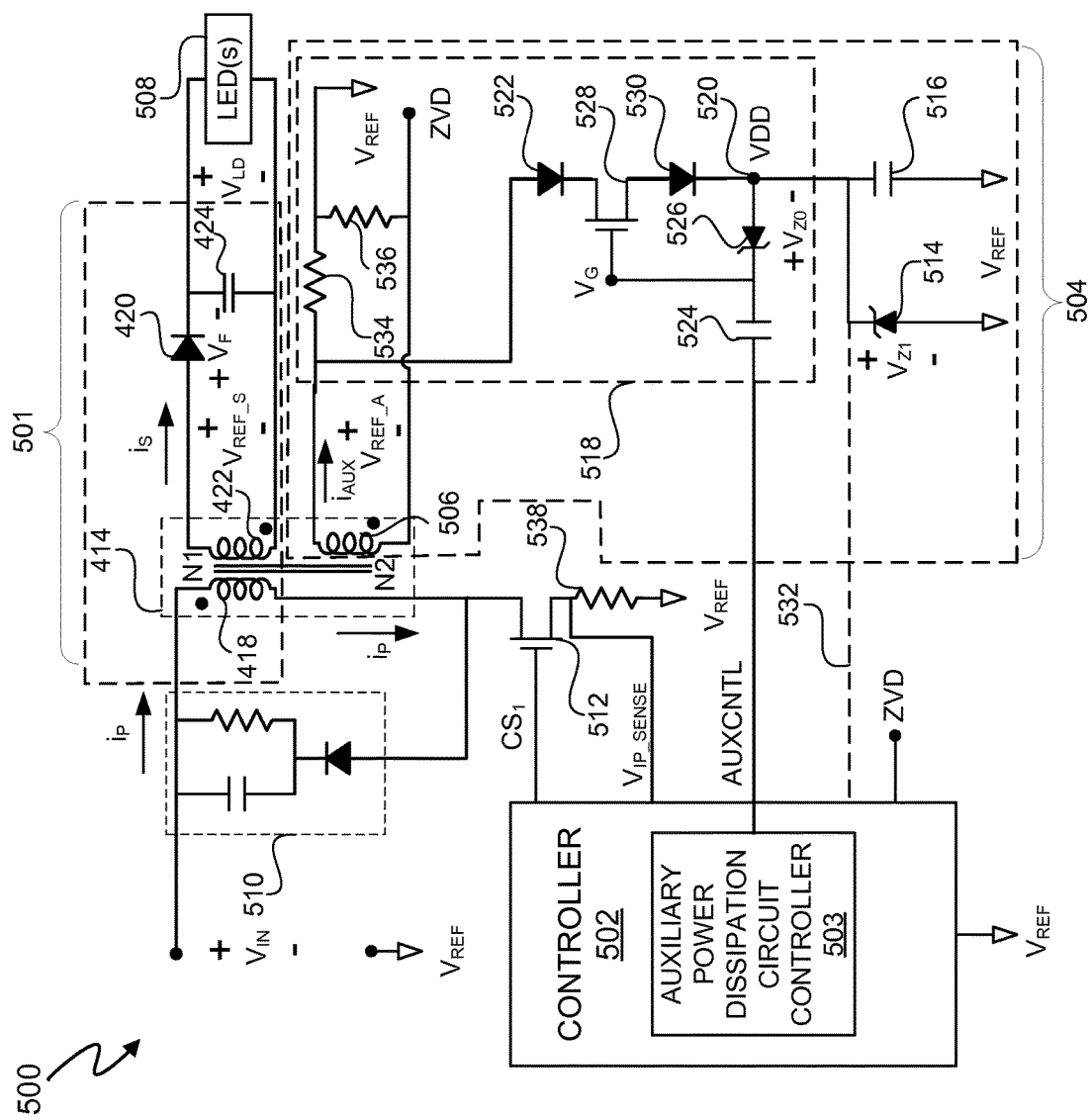
FIGS. 5 and 6 depict respective lighting systems, which each represent one embodiment of the electronic system of FIG. 4.

FIG. 5 depicts a lighting system 500, which represents one embodiment of the electronic system 400 of FIG. 4. The lighting system 500 includes a switching power converter 501 and a controller 502, which represents one embodiment of controller 402. Controller 502 includes an auxiliary power dissipation circuit controller 503 that generates the excess energy control signal AUXCNTL to transfer excess energy from the primary-side winding 418 to the auxiliary power dissipation circuit 504 during a flyback phase of the switching power converter 501. The auxiliary power dissipation circuit 504 represents one embodiment of the auxiliary power dissipation circuit 408. The auxiliary power dissipation circuit 504 is "actively controllable" because the auxiliary power dissipation circuit controller 503 controls when the auxiliary power dissipation circuit 504 generates and does not generate power. In at least one embodiment, the auxiliary power dissipation circuit controller 504 is incorporated into controller 502; although, whether the auxiliary power dissipation circuit controller 504 is incorporated as part of the controller 502 or separate from the controller is a matter of design choice.

The controller 502 is configured to control the switching power converter 501 so that that during the transfer of energy to the auxiliary-winding 506, the switching power converter 501 does not transfer energy to secondary-winding 422. Thus, the switching power converter 501 isolates the secondary transformer winding current $i_S$ from an auxiliary-winding current $i_{AUX}$. By isolating the energy delivered to the secondary-winding 506, in at least one embodiment, the controller 502 can transfer excess energy to the auxiliary power dissipation circuit 504 without affecting in any significant way the energy transferred to the one or more LEDs 508. The LED(s) 508 represent one embodiment of the load 404. A diode and resistor-capacitor filter circuit 510 provides a path for voltage perturbations.

The switching power converter 501 is configured in a flyback configuration so that when FET 512 conducts (switch 502 represents one embodiment of the primary-side current control circuit 416) the primary-side current $i_P$, and the primary-side current $i_P$ ramps up through the primary-side winding 418. The dot convention of primary-side winding 418 and the diode 420 prevent flow of the secondary-side current $i_S$ from the secondary-winding 506 when the primary current $i_P$ is drawn into the primary-side winding 418. When the controller 502 generates the switch control signal $CS_1$ to stop the FET 512 from conducting the primary-side current $i_P$, the primary-side current $i_P$ falls to 0, and the voltage across the primary-side winding 418 reverses (also referred to as the "flyback phase"). During the flyback phase, the secondary-side current $i_S$ quickly rises and charges capacitor 424. Capacitor 424 provides an output voltage $V_{LD}$ and current to the LED(s) 508. The resistor 538 conducts the primary-side current $i_P$ and develops a voltage $V_{IP\_SENSE}$ that is directly proportional to the primary-side current $i_P$. In at least one embodiment, the controller 502 utilizes the voltage $V_{IP\_SENSE}$ to, for example, detect a peak value of the primary-side current $i_P$ to determine when the controller 502 deasserts the control signal $CS_1$. The term "deassert" refers to transitioning a signal from a logical 1 to a logical 0. The term "assert" refers to transitioning a signal from a logical 0 to a logical 1. In at least one embodiment, asserting the control signal $CS_1$ refers to generating a pulse of the control signal $CS_1$, and deasserting the control signal $CS_1$ refers to ending the pulse. The manner of generating the control signal $CS_1$ is a matter of design choice. In at least one embodiment, the control signal $CS_1$ is generated as described in U.S. patent application Ser. No. 12/919,086, entitled "Primary-Side Control of a Switching Power Converter With Feed Forward Delay Compensation", inventors Zhaohui He, et al., and filing date Jun. 1, 2012, which is hereby incorporated by reference in its entirety.

To cause the auxiliary power dissipation circuit 504 to receive energy from the primary-side winding 418, the auxiliary power dissipation circuit controller 503 asserts the excess energy control signal AUXCNTL while a value of a reflected voltage $V_{REF\_S}$ across the secondary-winding 422 is greater than a value of a reflected voltage $V_{REF\_A}$ across the auxiliary-winding 506. As subsequently explained in more detail, when the excess energy control signal AUXCNTL is asserted while the reflected voltage $V_{REF\_S}$ is greater than the reflected voltage $V_{REF\_A}$, the transfer of excess energy is isolated to the auxiliary power dissipation circuit 504. An asserted auxiliary power dissipation circuit control signal AUXCNTL has a value of VDD, which shifts the voltage across capacitor 524 and reverse biases the Zener diode 526. The Zener breakdown voltage $V_{Z0}$ of Zener diode 526 is greater than the threshold voltage of the FET 528. Thus, when the Zener diode 526 is reverse biased, the gate voltage $V_G$ rises to near VDD+$V_{Z0}$, such as +12V, and the FET 528 conducts. When the FET 528 conducts, a low impedance current path for auxiliary current $i_{AUX}$ is available through diode 522, FET 528, and diode 530. At time $t_0$, (see FIG. 8) control signal $CS_1$ is a logical one, and FET 512 conducts the primary current $i_P$ through the primary-winding 418.

The lighting system 500 includes a Zener diode 514 and capacitor 516 to respectively dissipate a portion of the excess energy as heat and store a portion of the excess energy for subsequent use. As subsequently described in more detail, the capacitor 516 dissipates a portion of the excess energy via charging to a Zener breakdown voltage $V_{Z1}$ set by the breakdown voltage $V_{Z1}$ of Zener diode 514. When the voltage VDD exceeds the Zener breakdown voltage $V_{z1}$, the Zener diode 514 conducts, and any portion of excess energy received after the capacitor 516 charges to the Zener breakdown voltage $V_{Z1}$ is dissipated by the Zener diode 514 as heat to prevent the voltage VDD from rising above the Zener breakdown voltage $V_{Z1}$.

The auxiliary power dissipation circuit controller 503 asserts the excess energy control signal AUXCNTL to control the energy transfer to the Zener diode 514 by generating a positive voltage pulse of the excess energy control signal AUXCNTL. The particular implementation of the auxiliary power dissipation circuit controller 503 is a matter of design choice. In at least one embodiment, the auxiliary power dissipation circuit controller 503 generates the pulse of the control signal AUXCNTL during each cycle of the input voltage $V_{IN}$, which is a half line cycle of the supply voltage $V_{SUPPLY}$ (FIG. 4), for which excess energy is to be transferred to the auxiliary power dissipation circuit 504. As long as a reflected voltage for the auxiliary winding 506 is smaller than the reflected voltage for the secondary-winding 422, energy can be transferred to the auxiliary-winding 506 during the flyback phase by turning on FET 512. U.S. patent application Ser. No. 13/715,451, entitled "Isolation of Secondary Transformer Winding Current During Auxiliary Power Supply Generation", and filed on Dec. 14, 2012 describes exemplary embodiments of generating the signal AUXCNTL. The dotted line 532 indicates that the voltage VDD can optionally be provided to the controller 502 as an auxiliary supply voltage. Thus, in at least one embodiment, the auxiliary power dissipation circuit 504 can also function as an auxiliary power supply.

The auxiliary power dissipation circuit 504 also includes resistors 534 and 536 configured as a voltage divider to sample the reflected voltage $V_{REF\_A}$. The voltage divider of resistors 534 and 536 has a relatively high impedance and conducts a negligible amount of current. The zero voltage detection (ZVD) signal represents the voltage across resistor 536, and the signal ZVD is used by the controller 502 to detect a zero crossing in the input voltage $V_{IN}$.

In at least one embodiment, when the controller 502 detects the zero crossing of the input voltage $V_{IN}$ via the signal ZVD, the dimmer 102 (e.g., as shown in FIG. 4) stops conducting. When the dimmer 102 stops conducting, there is no need for a hold current. Accordingly, the auxiliary power dissipation circuit controller 503 deasserts the excess energy control signal AUXCNTL to stop excess energy transfer corresponding to the hold current.

The switching power converter 501 does not deliver all energy to the LED(s) 508. The primary-side winding 418 delivers energy to both the secondary-winding 422 and the auxiliary-winding 506. Thus, in at least one embodiment, to precisely determine the amount of energy the switching power converter 501 transfers to the LED(s) 508, in at least one embodiment, the controller 502 ensures that the times when charge is delivered to the secondary-winding 422 and to the auxiliary-winding 506 are known and mutually exclusive. The auxiliary power dissipation circuit controller 503 and the actively controllable auxiliary power dissipation circuit 504 allow the controller 502 to isolate the energy transferred to the LED(s) 508 from the energy transferred to the auxiliary power dissipation circuit 504. By isolating the energy deliveries, the amount of energy transferred to the LED(s) 508 is not affected by the amount of energy transferred to the auxiliary power dissipation circuit 504, and the controller 502 can, thus, determine the amount of energy the switching power converter 501 delivers to the LED(s) 508. In at least one embodiment, the lighting system 500 achieves an isolation between transfer of energy to the secondary-side winding 422 and to the auxiliary-winding 506 by ensuring that a value of a reflected voltage $V_{REF\_S}$ across the secondary-winding 422 is greater than a value of a reflected voltage $V_{REF\_A}$ across the auxiliary-winding 506 when transferring energy to the auxiliary-winding 506 and, conversely, by providing a high impedance current path for the auxiliary current $i_{AUX}$ when transferring energy to the secondary-winding 422.

To isolate the energy transfer between the secondary-winding 422 and the auxiliary-winding 506, in at least one embodiment, the controller 502 controls mutually exclusive times for the transfer of energy from the primary-winding 418 of the transformer 414 to the secondary-winding 422 and to the auxiliary-winding 506 for the auxiliary power dissipation circuit 504. For example, during a first period of time, the controller 502 controls the transfer of energy from the primary-winding 418 of the transformer 414 to the secondary-winding 422. During a second period of time, the controller 502 actively controls transfer of energy from the primary-winding 418 to the auxiliary-winding 506 without transferring any energy to the secondary-winding.

Since the secondary-side current $i_S$ transfers energy to the LED(s) 508 only when diode 420 is forward biased. Diode 420 is forward biased only when the reflected voltage $V_{REF\_S}$ is greater than the forward bias voltage $V_F$ of diode 420 plus the load voltage $V_{LD}$. The forward bias voltage $V_F$ of diode 420 is generally less than or equal to 1V, such as 0.7V. The auxiliary power controller 503 controls the reflected voltage across the auxiliary-winding 506 by controlling the auxiliary power dissipation circuit control circuitry 518. In at least one embodiment, when the auxiliary power dissipation circuit controller 503 asserts the auxiliary voltage control signal AUXCNTL, the auxiliary power dissipation circuit control circuitry 518 provides a low impedance path from the auxiliary-winding 506 to the node 520. The low impedance path keeps the reflected voltage $V_{REF\_A}$ at the voltage level VDD across the capacitor 516. The auxiliary power dissipation circuit controller 503 controls the auxiliary power dissipation circuit control circuitry 518 so that when energy is transferred from the primary-winding 418 to the auxiliary-winding 506, the reflected voltage $V_{REF\_A}$ is less than the value of the forward bias voltage $V_F$ of diode 420 plus the load voltage $V_{LD}$, i.e. when the signal AUXCNTL is asserted, $V_{REF\_A} < (V_F + V_{LD})$. Thus, since the flyback voltage across the primary-winding 418 does not rise instantaneously, the reflected voltage $V_{REF\_A}$ will remain less than $(V_F + V_{LD})$ as the primary-winding 418 transfers energy to the auxiliary-winding 506. Since the reflected voltage $V_{REF\_A}$ will remain less than $(V_F + V_{LD})$, diode 420 will be reversed biased, and the secondary current $i_S$ will not flow. Thus, no charge is transferred to the LED(s) 508 when the auxiliary power dissipation circuit controller 503 asserts the auxiliary voltage control signal AUXCNTL.

Conversely, in at least one embodiment, when the auxiliary power dissipation circuit controller 503 deasserts the auxiliary voltage control signal AUXCNTL, the auxiliary power dissipation circuit control circuitry 518 raises an impedance of the auxiliary power dissipation circuit 504 to a value that prevents most if not all energy transfer to the auxiliary-winding 506. Thus, the primary-winding 418 transfers all energy to the secondary-winding 422. The auxiliary power dissipation circuit control circuitry 518 raises an impedance of the auxiliary power dissipation circuit 504 by causing the FET 528 to stop conducting and become an open circuit between the diode 522 and the capacitor 516. When all energy is transferred to the secondary-side winding, the diode 420 is forward biased, and the secondary-side current $i_S$ delivers all the charge from the primary-winding 418 to the secondary-winding 422 and then to the LED(s) 508. Since the auxiliary power dissipation circuit controller 503 can control mutually exclusive energy transfer to the LED(s) 508 and to the auxiliary power dissipation circuit 504, the controller 502 can determine very precisely the amount of charge delivered to the LED(s) 508.

When all energy is transferred to the secondary-winding 422, the auxiliary power dissipation circuit controller 503 controls the auxiliary power dissipation circuit circuitry 518 so that the reflected voltage $V_{REF\_A}$ is less than the value of the forward bias voltage $V_F$ of diode 420 plus the load voltage $V_{LD}$, i.e. when the signal AUXCNTL is asserted, $V_{REF\_A} < (V_F + V_{LD})$. Thus, since the flyback voltage across the primary-winding 418 does not rise instantaneously, the reflected voltage $V_{REF\_A}$ will remain less than $(V_F + V_{LD})$ as the primary-winding 418 transfers energy to the auxiliary-winding 506. Since the reflected voltage $V_{REF\_A}$ will remain less than $(V_F + V_{LD})$, diode 420 will be reversed biased, and the secondary current $i_S$ will not flow. Thus, no charge is transferred to the LED(s) 508 when the auxiliary power dissipation circuit controller 503 asserts the auxiliary voltage control signal AUXCNTL.

The reflected voltage $V_{REF\_S}$ is determined in accordance with Equation 1:

$$V_{REF\_S} = V_{LD} \cdot N1 \quad \text{Equation 1}$$

$V_{REF\_S}$ is the reflected voltage due to the secondary-winding 422, $V_{LD}$ is the voltage across the LED(s) 508, and N1 is the turns ratio between the secondary-winding 422 and the primary-winding 418.

The reflected voltage $V_{REF\_A}$ when the excess energy control signal AUXCNTL is asserted is determined in accordance with Equation 2:

$$V_{REF\_A} = VDD \cdot N2 \quad \text{Equation 2}$$

$V_{REF\_A}$ is the reflected voltage due to the auxiliary-winding 506 of the auxiliary power dissipation circuit 504, VDD is the voltage across the auxiliary power dissipation circuit 504 when the excess energy control signal AUXCNTL is asserted, and N2 is the turns ratio between the auxiliary-winding 506 and the primary-winding 418.

Figure 6:
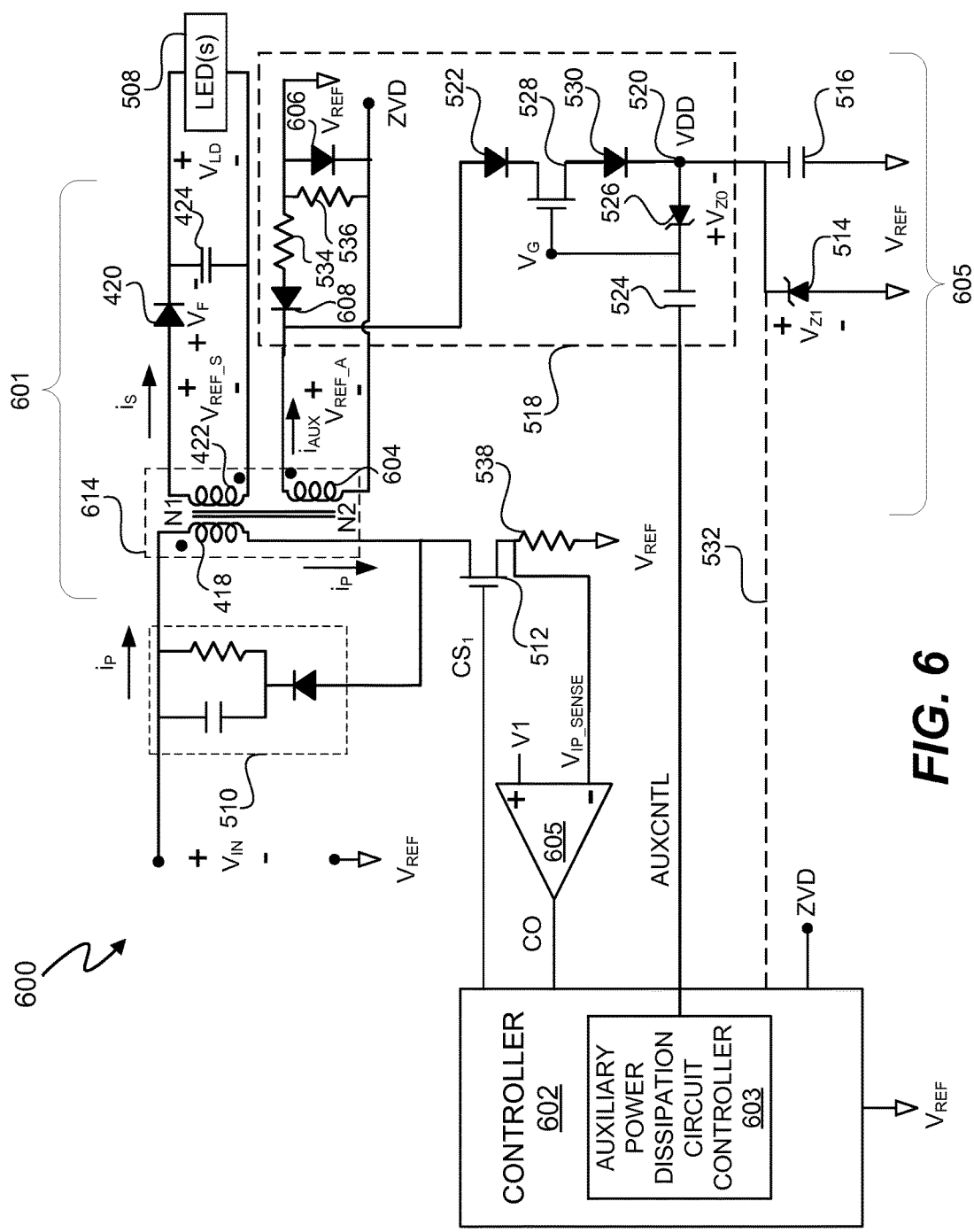

FIG. 6 depicts a lighting system 600, which represents one embodiment of the electronic system 400 of FIG. 4. The lighting system 600 includes a switching power converter 601 and a controller 602, which represents one embodiment of controller 402. Controller 602 includes an auxiliary power dissipation circuit controller 603 that generates the excess energy control signal AUXCNTL to transfer excess energy from the primary-side winding 418 to the auxiliary power dissipation circuit 605 during a forward phase of the switching power converter 501.

The configuration of the auxiliary winding 604 in transformer 614 is not dependent on the type of DC-DC converter and the following discussion can be extended to any other DC-DC converter topology (isolated or non-isolated) as long as the auxiliary winding 604 has the same dot configuration as the primary-side winding 418.

When not transferring energy drawn by the primary-side winding 418 to the auxiliary-winding 604, the auxiliary power dissipation circuit controller 603 drives the control signal AUXCNTL to a logical zero (e.g. 0V). When the control signal AUXCNTL is thereby deasserted, the gate voltage $V_G$ drops and turns the FET 528 OFF (i.e. nonconductive). Turning the FET 528 OFF prevents any significant energy transfer to the auxiliary-winding 604 (except for the negligible current used to generated the ZVD signal). When the controller 602 generates a pulse of the control signal $CS_1$, the primary-side current $i_P$ ramps up in the primary-side winding 418. When the primary-side current $i_P$ ramps up, the auxiliary current $i_{AUX}$ also ramps up, which transfers energy from the primary-winding 418 to the auxiliary-winding 604.

To determine when to stop the energy transfer, a comparator 607 compares a reference voltage V1 with a primary-side current $i_P$ sense voltage $V_{IP\_SENSE}$ developed across the sense resistor 538. The reference voltage V1 equals a target current $i_{TARGET}$ times $R_{SENSE}$, i.e. $V1 = i_{REF} \cdot R_{SENSE}$. "$R_{SENSE}$" represents the resistance of resistor 538. Thus, comparison of voltage V1 against voltage $V_{IP\_SENSE}$ essentially compares the primary-side current $i_P$ against the target current $i_{TARGET}$. When the primary-side current $i_P$ reaches the target value $i_{TARGET}$, the comparator 605 transitions the comparator output signal CO from a logical 1 to a logical 0. The controller 602 then deasserts the control signal $CS_1$ to turn the FET 512 OFF. Generating a logical zero value of the control signal AUXCNTL stops the excess energy transfer, and turning the FET 512 OFF stops the primary-side current $i_P$. The excess energy transfer mechanism is discussed with reference to FIGS. 6 and 7.

The value of the reference voltage V1 is a matter of design choice. The value of the reference voltage V1 sets the state change point for the comparator 607. Thus, increasing the value of the reference voltage V1 increases the excess energy transfer time and, thus, increases the amount of excess energy transferred to the capacitor 516 and Zener diode 514 of the auxiliary power dissipation circuit 605 during a cycle of the excess energy control signal AUXCNTL. Conversely, decreasing the value of the reference voltage V1 decreases the excess energy transfer time and, thus, decreases the amount of excess energy transferred to the capacitor 516 and Zener diode 514 of the auxiliary power dissipation circuit 605 during a cycle of the excess energy control signal AUXCNTL. When the control signal AUXCNTL is driven high simultaneously with the control signal $CS_1$, energy is transferred to capacitor 516. The impact of turning on control signal AUXCNTL and the detection of a peak value of primary current IP is next discussed. In at least one embodiment, the controller 602 generates the control signal $CS_1$ as described in conjunction with controller 502.

Figure 7:
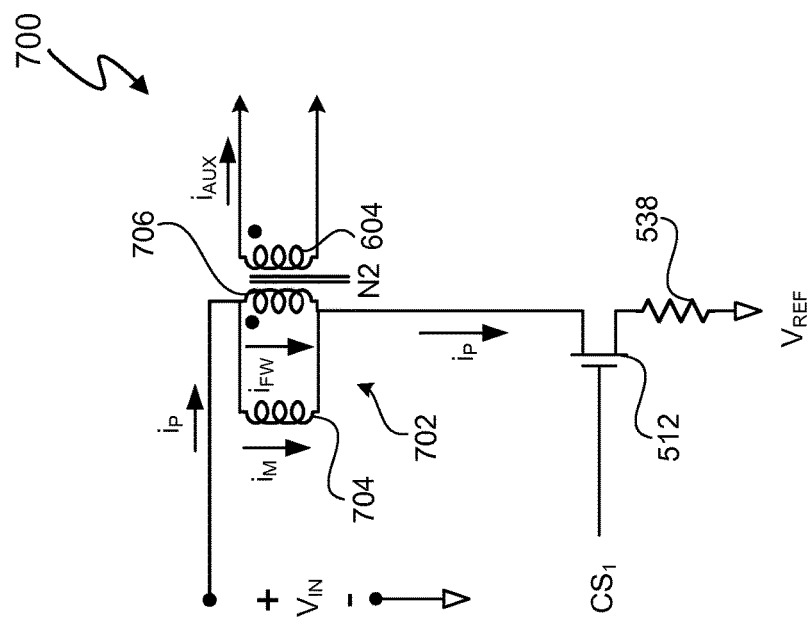
FIG. 7 depicts a primary-side and auxiliary-side transformer model configuration of the lighting system of FIG. 6.
Figure 8:
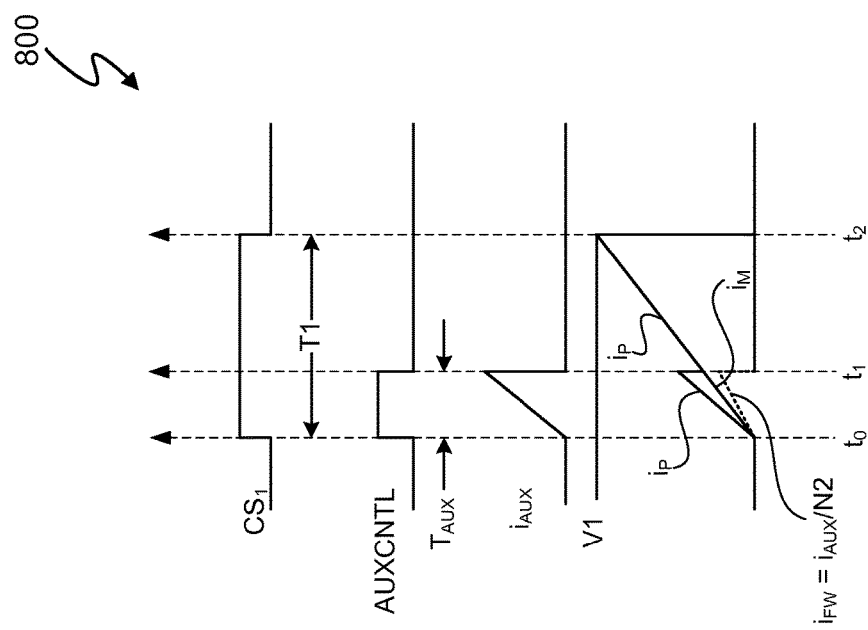
FIG. 8 depicts waveforms associated with the primary-side and auxiliary-side transformer model configuration of FIG. 7.

FIG. 7 depicts a primary-side and auxiliary-side transformer model configuration 700 of the lighting system 600. FIG. 8 depicts waveforms associated with the primary-side and auxiliary-side transformer model configuration 700. Referring to FIGS. 7 and 8, the primary-side winding 702 is an equivalent of the primary-side winding 418 (FIG. 6) and is modeled as a magnetizing inductance 704 in parallel with an ideal transformer consisting of primary winding 706 and auxiliary-winding 708. Thus, the primary-side current $i_P$ consists of two components: (1) the magnetizing component $i_M$ and (2) the forward component $i_{FW}$ (where $i_P = i_{FW} + i_M$).

Referring to FIGS. 6-8, in at least one embodiment, at time $t_0$, auxiliary power dissipation circuit controller 603 generates the control signal AUXCNTL to turn the switch 528 ON at the same time the controller 602 asserts a pulse of the control signal $CS_1$. At time $t_0$, the auxiliary-winding current $i_{AUX}$ also ramps up linearly with time, and the current $i_{AUX}$ is reflected to the primary winding 706 as forward component $i_{FW} = i_{AUX}/N2$. Thus, the primary-side current $i_P = i_M + i_{FW} = i_M + i_{AUX}/N2$ for the period $T_{AUX}$ of the control signal AUXCNTL. Once sufficient excess energy has been transferred to capacitor 516 and Zener diode 514 (FIG. 6), the controller 602 drives the control signal AUXCNTL low at time t1. Driving the control signal AUXCNTL causes the auxiliary current $i_{AUX}$ to go to zero, which in turn causes the reflected forward component $i_{FW}$ to go to zero. Thus, between times t1 and t2, when the control signal $CS_1$ is driven low, the primary-side current $i_P$ equals the magnetizing component $i_M$. The primary-side current $i_P$ thus ramps up with a slope governed by the magnetizing component $i_M$ until the voltage $V_{IP\_SENSE}$ across resistor 538 reaches voltage V1. At time t2, the comparator 605 changes states indicating via signal CO to the controller 602 that the primary-side current $i_P$ sense voltage $V_{IP\_SENSE}$ has reached the reference voltage V1. The controller 602 then turns switch 528 OFF, thus causing the energy built in the transformer 614 to be transferred to the secondary winding 422 and the LED(s) 508. In at least one embodiment, the duration of period $T_{AUX}$ for control signal AUXCNTL can be varied by the controller 602 to determine the amount of excess energy to transfer to the auxiliary power dissipation circuit 605.

In at least one embodiment, for the lighting system 600 to function properly by controlling excess energy transfer to the auxiliary power dissipation circuit 605 and providing energy to the LED(s) 508, in at least one embodiment, the auxiliary power dissipation circuit controller 603 ensures that the voltage $V_{IP\_SENSE}$ across resistor 538 does not reach the reference voltage V1 while the control signals $CS_1$ and AUXCNTL are driven high. If the reference voltage V1 is reached when both control signals $CS_1$ and AUXCNTL are driven high, the comparator 605 will generate a state change, even though the actual energy build up in the transformer 614 has not yet reached the desired level. This false comparator state change will cause a transfer of lesser than expected energy to the secondary winding 604 when the control signal $CS_1$ is driven low, thus, causing problems in regulating the secondary-side current $i_S$. In at least one embodiment, the lighting system 600 properly functions when the lighting system 600 complies with the following three constraints:

1. The period $T_{AUX}$ for control signal AUXCNTL is short enough so that the primary-side current $i_P$ does not increase sufficiently to cause the sensed voltage $V_{IP\_SENSE}$ to exceed the reference voltage V1 during the period $T_{AUX}$.
2. The controller 602 can ignore any comparator state change detected during the period $T_{AUX}$ for control signal AUXCNTL and can deassert the control signal $CS_1$ at a following state change of comparator 605.
3. Choosing a large enough turns ratio N2 to ensure that the ramp up of the auxiliary winding current $i_{AUX}$ does not lead to a significant forward component $i_{FW}$, thus reducing the chances of the voltage $V_{IP\_SENSE}$ reaching the voltage reference V1 when AUX_CNTL signal is driven high.

Thus, an electronic system and method, such as a lighting system and method, include a controller to actively control transfer of excess energy to an auxiliary-winding of an auxiliary power dissipation circuit.

Although embodiments have been described in detail, it should be understood that various changes, substitutions, and alterations can be made hereto without departing from the spirit and scope of the invention as defined by the appended claims.

What is claimed is:

1. An apparatus comprising:
    a controller configured to (a) control a transfer of energy drawn from a power supply through a primary-side winding of a switching power converter to a secondary-winding coupled to a load and (b) generate an excess energy control signal to control a transfer of excess energy, drawn from a power supply through the primary-side winding of the switching power converter, to an auxiliary-winding of an auxiliary power dissipation circuit to dissipate the excess energy, wherein the excess energy comprises energy drawn through the primary-side winding of the switching power converter to provide operational compatibility between a dimmer and a load, wherein the controller is further configured to isolate energy transfer between the secondary-winding and the auxiliary-winding in mutually exclusive periods of time; and
    wherein the switching power converter is a flyback-type switching power converter, the controller is configured to generate the excess energy control signal during a controlled power auxiliary transfer phase, and the controlled power auxiliary transfer phase occurs during a charging phase and before a subsequent flyback phase of the switching power converter.

2. The apparatus of claim 1 wherein the controller is configured to control the transfer of excess energy to the auxiliary-winding to provide compatibility between the load and the dimmer coupled to the switching power converter in a lighting system.

3. The apparatus of claim 1 wherein the switching power converter is a flyback-type switching power converter, the controller is configured to generate the excess energy control signal during an energy transfer phase, and the energy transfer phase occurs after a primary-side winding charging phase begins and before an end of a subsequent flyback phase of the switching power converter.

4. The apparatus of claim 1 further comprising:
    the auxiliary power dissipation circuit, wherein the auxiliary power dissipation circuit includes a switch coupled to the controller and having a control terminal to receive the excess energy control signal and the power dissipation circuit comprises a passive circuit coupled to the switch to dissipate the excess energy when the controller generates the excess energy control signal.

5. The apparatus of claim 4 wherein the passive circuit comprises a Zener diode.

6. The apparatus of claim 1 further comprising:
the switching power converter is coupled to the controller and the load.

7. An apparatus comprising:
a controller configured to (a) control a transfer of energy drawn from a power supply through a primary-side winding of a switching power converter to a secondary-winding coupled to a load and (b) generate an excess energy control signal to control a transfer of excess energy, drawn from a power supply through the primary-side winding of the switching power converter, to an auxiliary-winding of an auxiliary power dissipation circuit to dissipate the excess energy, wherein the excess energy comprises energy drawn through the primary-side winding of the switching power converter to provide operational compatibility between a dimmer and a load, wherein the controller is further configured to isolate energy transfer between the secondary-winding and the auxiliary-winding in mutually exclusive periods of time wherein the controller is further configured to dissipate additional excess energy in circuitry of the switching power converter other than the auxiliary power dissipation circuit;
wherein the switching power converter comprises a flyback-type switching power converter, and wherein the controller is configured to transfer the excess energy during one of a flyback phase of the switching power converter and a forward phase of the switching power converter.

8. The apparatus of claim 1 wherein the excess energy is dissipated as power in a form of at least one member of a group consisting of heat and energy storage.

9. A method comprising:
controlling via a controller a transfer of energy drawn from a power supply through a primary-side winding of a switching power converter to a secondary-winding coupled to a load;
generating an excess energy control signal to control a transfer of excess energy, drawn from a power supply through the primary-side winding of the switching power converter, to an auxiliary-winding of an auxiliary power dissipation circuit to dissipate the excess energy, wherein the excess energy comprises energy drawn through the primary-side winding of the switching power converter to provide operational compatibility between a dimmer and a load and energy transfer between the secondary-winding and the auxiliary-winding is isolated in mutually exclusive periods of time
wherein the auxiliary power dissipation circuit includes a switch coupled to the controller and having a control terminal,
generating the excess energy control signal;
during generation of the excess energy control signal, dissipating power in a passive circuit of the auxiliary power dissipation circuit; and
wherein the switching power converter is a flyback-type switching power converter, and the method further comprises generating the excess energy control signal during a controlled power auxiliary transfer phase, and the controlled power auxiliary transfer phase occurs during a charging phase and before a subsequent flyback phase of the switching power converter.

10. The method of claim 9 further comprising controlling the transfer of excess energy to the auxiliary-winding to provide compatibility between the load and a dimmer coupled to the switching power converter in a lighting system.

11. The method of claim 9 wherein the switching power converter is a flyback-type switching power converter, and the method further comprises:
generating the excess energy control signal during an energy transfer phase, and the energy transfer phase occurs after a primary-side winding charging phase begins and before an end of a subsequent flyback phase of the switching power converter.

12. The method of claim 9 wherein the method further comprises dissipating additional excess energy in circuitry of the switching power converter other than the auxiliary power dissipation circuit.

13. The method of claim 9 further comprising:
dissipating the excess energy as power in a form of at least one member of a group consisting of heat and energy storage.

14. A lighting system comprising:
one or more light emitting diodes (LEDs);
a switching power converter coupled to the LEDs; and
a controller configured to (1) control a transfer of energy drawn from a power supply through a primary-side winding of a switching power converter to a secondary-winding coupled to a load, (2) generate an excess energy control signal to control a transfer of excess energy, drawn from the power supply through the primary-side winding of a switching power converter, to an auxiliary-winding of an auxiliary power dissipation circuit to dissipate the excess energy, and (3) control power conversion by the switching power converter for the LEDs, wherein the excess energy comprises energy drawn through the primary-side winding of the switching power converter to provide operational compatibility between a dimmer and the LEDs; and
wherein the switching power converter is a flyback-type switching power converter, the controller is configured to generate the excess energy control signal during a controlled power auxiliary transfer phase, and the controlled power auxiliary transfer phase occurs during a charging phase and before a subsequent flyback phase of the switching power converter.

15. The lighting system of claim 14 wherein the switching power converter is a flyback-type switching power converter, the controller is configured to generate the excess energy control signal during an energy transfer phase, and the energy transfer phase occurs after a primary-side winding charging phase begins and before an end of a subsequent flyback phase of the switching power converter.

16. The lighting system of claim 14 further comprising the auxiliary power dissipation circuit.

17. The lighting system of claim 16 wherein the auxiliary power dissipation circuit is configured to dissipate the excess energy and provide an auxiliary power supply voltage.

* * * * *